United States Patent [19]
Enderby

[11] Patent Number: 5,665,399
[45] Date of Patent: Sep. 9, 1997

[54] INTERFACE UNITS FOR EXTRUSION BLOW MOULDING CONTROL SYSTEMS

[76] Inventor: George Robin Enderby, Orchard Way, Teddington, Gloucestershire GL20 8JA, England

[21] Appl. No.: 548,862

[22] Filed: Oct. 26, 1995

[30] Foreign Application Priority Data

Nov. 3, 1994 [GB] United Kingdom ............... 9422187

[51] Int. Cl.⁶ ............................................. B29C 49/78
[52] U.S. Cl. ..................... 425/140; 264/40.4; 425/466; 425/532
[58] Field of Search .................... 425/140, 148, 425/532, 466, 141; 264/40.4

[56] References Cited

U.S. PATENT DOCUMENTS

| 3,936,713 | 2/1976 | Hunkar | 425/141 |
|---|---|---|---|
| 4,474,716 | 10/1984 | Daubenbüchel et al. | 264/40.4 |
| 5,102,588 | 4/1992 | Feuerherm | 425/148 |
| 5,338,173 | 8/1994 | Kato et al. | 425/466 |
| 5,409,647 | 4/1995 | Kiefer et al. | 425/532 |

FOREIGN PATENT DOCUMENTS

| 2533077 | 2/1977 | Germany | 425/140 |
|---|---|---|---|
| 4-344220 | 11/1992 | Japan | 425/140 |
| WO91/06418 | 5/1991 | WIPO . | |

OTHER PUBLICATIONS

R. Hegele et al., "Gewichtsregelung an kontinuierlich extrudierenden Blasformanlagen", Machinen und Verarbeitung, vol. 70, No. 9, 1980, pp. 522–524.

*Primary Examiner*—Robert Davis
*Attorney, Agent, or Firm*—Young & Thompson

[57] ABSTRACT

An extrusion blow mounding control system for controlling parison wall thickness in an extrusion blow moulding machine includes a wall thickness controller for controlling the width of an extrusion die gap defining parison wall thickness within the machine, an interface unit for supplying an input signal to the wall thickness controller dependent on an actual position signal from a position transducer indicative of the actual position of a movable die member delimiting the die gap, and an output for supplying a desired position signal from the wall thickness controller to an electrohydraulic servo valve for controlling the position of the movable die member to provide a desired width of the die gap. The interface unit includes signal processing circuitry for receiving the actual position signal from the position transducer and a feedback signal from an automatic weighing system indicative of weight variation of product outputted by the machine and for producing the input signal for the wall thickness controller in dependence on the actual position signal and the feedback signal. Such a closed loop control system can be used to control the weight of the final product within a narrow weight range, and this results in improved product consistency and quality, as well as enabling the total quantity of moulding material used in moulding of the product to be decreased.

9 Claims, 4 Drawing Sheets

INTERFACE UNITS FOR EXTRUSION BLOW MOULDING CONTROL SYSTEMS

This invention relates to interface units for extrusion blow moulding control systems for controlling parison wall thickness in extrusion blow moulding machines.

BACKGROUND OF INVENTION

Many plastics mouldings, such as plastics bottles and medical and automotive mouldings, are produced by means of an extrusion blow moulding machine which forms a plastics tube, called a parison, by extrusion, and then, after transferring it to a mould, inflates the tube within the mould. In use of such an extrusion blow moulding technique in a production process, changes in the constituency of the moulding material or in the ambient temperature, or machine variations can all have an effect on the properties of the final moulded product, and in particular on the weight of the product. Since variation in the product weight can cause it to drift outside acceptable limits, it is important to control the extrusion blow moulding process so as to keep the product weight within acceptable limits.

A conventional extrusion blow moulding machine incorporates an annular die gap through which the moulding material is extruded to produce the tubular parison which is subsequently subjected to blow moulding to produce a product which is outputted from the machine. The die gap can be controlled by a movable member which is displaceable by supply of hydraulic fluid to a cylinder under the control of an electrohydraulic servovalve. The servovalve is under the control of a parison programmer which is set by the machine operator to the desired wall thickness and weight settings and which receives a feedback signal from a transducer indicative of the actual position of the movable member, and which supplies an output signal to the servovalve to effect movement of the movable member to a desired position corresponding to the desired width of the die gap. Furthermore the parison programmer may be programmed to vary the wall thickness during extrusion of the parison so that the wall thickness of the generally tubular parison varies along its length in the manner required by the form of the final moulded product, that is to take account of features such as the shaped bottom and the necked outlet of a container, for example.

Whilst such a control system enables the parison wall thickness to be controlled so as to produce final moulded products of reasonable quality and within a permitted weight range, the inherent tolerances of the control system are such that it may be necessary for the machine operator to aim to produce overweight products so as to ensure that the lightest product so produced does not fall below the permitted minimum weight.

It is an object of the invention to provide a novel interface unit for an extrusion blow moulding control system which enables parison wall thickness to be controlled with sufficient accuracy to enable the weight of the final product to be maintained within a narrow weight range.

SUMMARY OF INVENTION

According to the present invention there is provided an interface unit for an extrusion blow moulding control system for controlling parison wall thickness in an extrusion blow moulding machine, the interface unit being adapted to supply an input signal dependent on the actual width of an extrusion die gap defining parison wall thickness within the machine, as determined by transducer means from the position of a movable member delimiting the die gap, to a wall thickness controller for supplying a desired position signal to displacement means for controlling the position of the movable member to provide a desired width of the die gap, wherein the interface unit comprises signal processing means for receiving an actual position signal from the transducer means and a feedback signal from weighing means indicative of weight variation of product outputted by the machine and for producing the input signal for the wall thickness controller in dependence on the actual position signal and the feedback signal.

Such an interface unit provides an input signal to the wall thickness controller (parison programmer) which depends not only on the actual position of the movable member delimiting the die gap, but also on the weight of the product which will usually be determined by an automatic weighing system which weighs each moulded product as it emerges from the machine. Depending on the values of these two parameters, or on the variation of these parameters with time, an input signal may be supplied to the controller which results in control of the die gap so as to produce slightly lighter or heavier products, as the case may be and where necessary. Such a closed loop control system can be used to control the weight of the final product within a narrow weight range, and this results in improved product consistency and an improvement in production quality. Furthermore the improved product consistency permits the machine to be set to produce product having a target weight which is only slightly above a permitted minimum weight, whilst ensuring that all products outputted by the machine are above the minimum weight. Because the products so produced will vary over a narrow weight range which is only slightly above the permitted minimum weight, it will be appreciated that the total quantity of moulding material used to produce such products can be significantly decreased as compared with the case when such a machine is controlled by a conventional control system, and significant cost savings will result.

Preferably the interface unit includes input means for receiving the feedback signal and for supplying a correction factor to compensate for underweight or overweight product outputted by the machine.

The input means may include a digital-to-analogue converter for converting the feedback signal to an analogue signal.

Furthermore the input means may include an integrator for integrating the signal to produce the correction factor.

The input means may also include a memory for storing the current correction factor. This enables the correction factor to be made available again after a temporary shutdown of the machine.

The interface unit also preferably includes level shifting means having a first input to which the actual position signal is supplied and a second input to which the correction factor is applied in order to shift the level of the actual position signal.

The invention also provides an extrusion blow moulding control system for controlling parison wall thickness in an extrusion blow moulding machine, the control system comprising a wall thickness controller for controlling the width of an extrusion die gap defining parison wall thickness within the machine, input means for supplying an input signal to the wall thickness controller dependent on an actual position signal from transducer means indicative of the actual position of a movable member delimiting the die gap, and output means for supplying a desired position signal from the wall thickness controller to displacement means for controlling the position of the movable member to provide a desired width of the die gap, wherein the input means comprises signal processing means for receiving the actual position signal from the transducer means and a feedback signal from weighing means indicative of weight variation of product outputted by the machine and for producing the input signal for the wall thickness controller in dependence on the actual position signal and the feedback signal.

In a preferred embodiment the wall thickness controller is adapted to vary the width of the die gap during extrusion of a parison so as to vary the wall thickness of the parison along its length to provide a desired wall thickness profile. This enables production of a generally tubular parison having a wall thickness which varies in the required manner so as to produce the required blow moulded product, such as a container having a shaped bottom and a necked outlet at its top, for example.

Furthermore the wall thickness controller is preferably adapted to be manually adjustable to vary the desired wall thickness profile and/or the desired parison weight.

BRIEF DESCRIPTION OF THE DRAWINGS

In order that the invention may be more fully understood, a preferred embodiment of interface unit in accordance with the invention will now be described, by way of example, with reference to the accompanying drawings, in which.

DETAILED DESCRIPTION OF THE DRAWINGS

Figure 1:
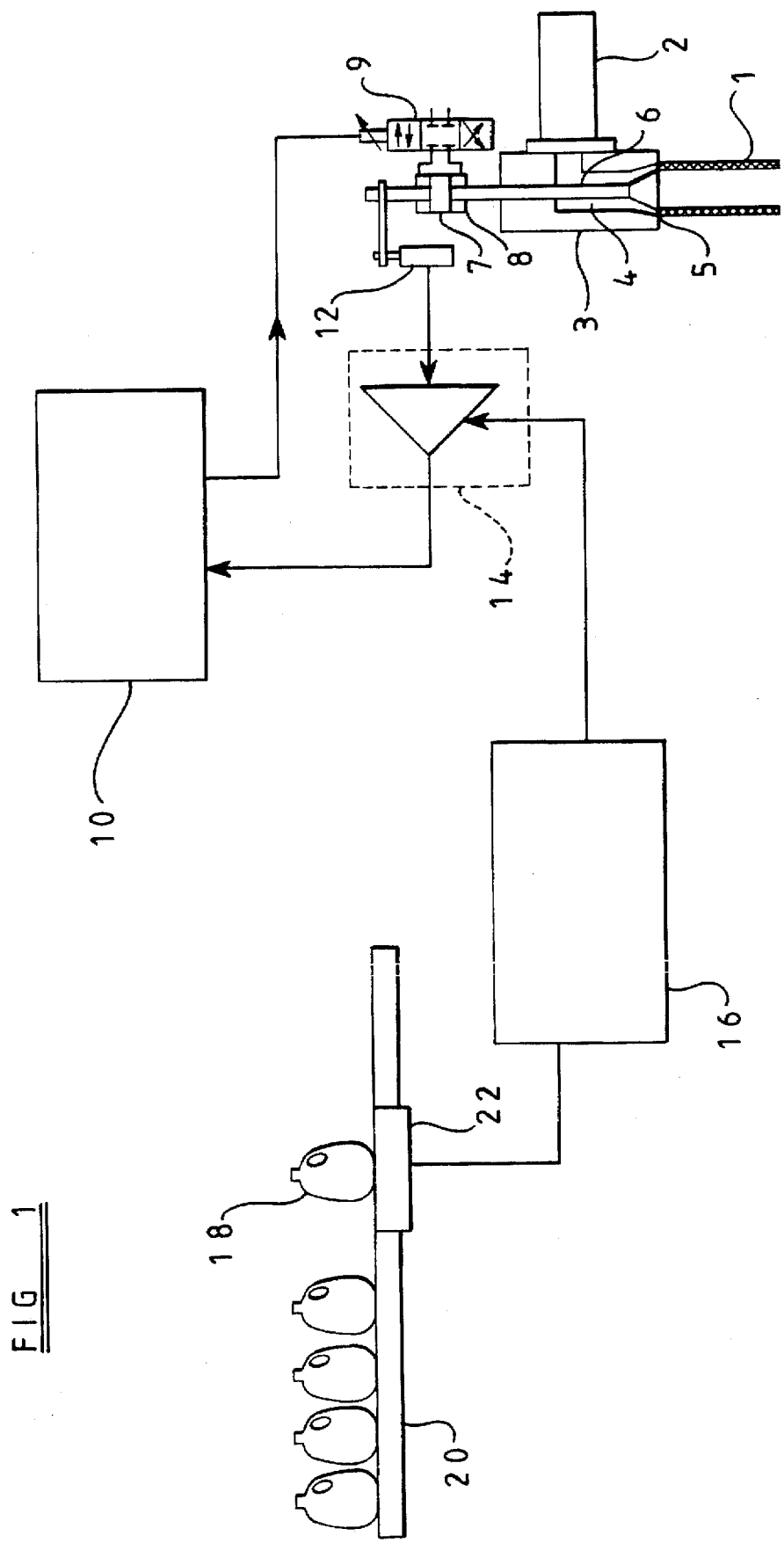
FIG. 1 is a block diagram of an extrusion blow moulding control system incorporating the interface unit.

Referring to FIG. 1, a parison 1 is produced by an extruder 2, forming part of an extrusion blow moulding machine, by extrusion of moulding material through a die 3 which incorporates a die passage 4 terminating in an annular die gap 5 through which the moulding material is extruded. The annular die gap 5 is defined between a frustoconical internal surface of the passage 4 and a frustoconical outer surface of a movable die member 6 coupled to a piston 7 within a hydraulic cylinder 8, such that the radial width of the die gap 5 may be varied by movement of the piston 7 within the cylinder 8. An electrohydraulic servo or proportional valve 9 is provided for selectively supplying hydraulic fluid to the cylinder 8 above and below the piston 7 under control of an output signal from a wall thickness controller 10 (parison programmer) so as to effect upward or downward movement of the movable die member 6 to decrease or increase the width of the die gap 5.

A position transducer 12 senses the position of the movable die member 6, which determines the width of the die gap 5, and supplies an analogue actual position signal dependent on the sensed position to an interface unit 14. The interface unit 14 also receives an increase/decrease weight feedback signal from an automatic weighing system 16 which automatically weighs each moulded container 18 outputted from the machine on a conveyor 20 as the container reaches a weighing platform 22. The automatic weighing system 16 incorporates comparison circuitry which compares the rolling average of a predetermined number of weight values with a target weight value, and supplies either an increase weight digital signal of appropriate duration to at increase weight input of the interface unit 14 or a decrease weight digital signal of appropriate duration to a decrease weight input of the interface unit 14, as the case may be. The interface unit 14 supplies an input signal to the wall thickness controller 10 which is dependent on both the actual position signal received from the transducer 12 and the feedback signal received from the automatic weighing system 16.

Figure 2:
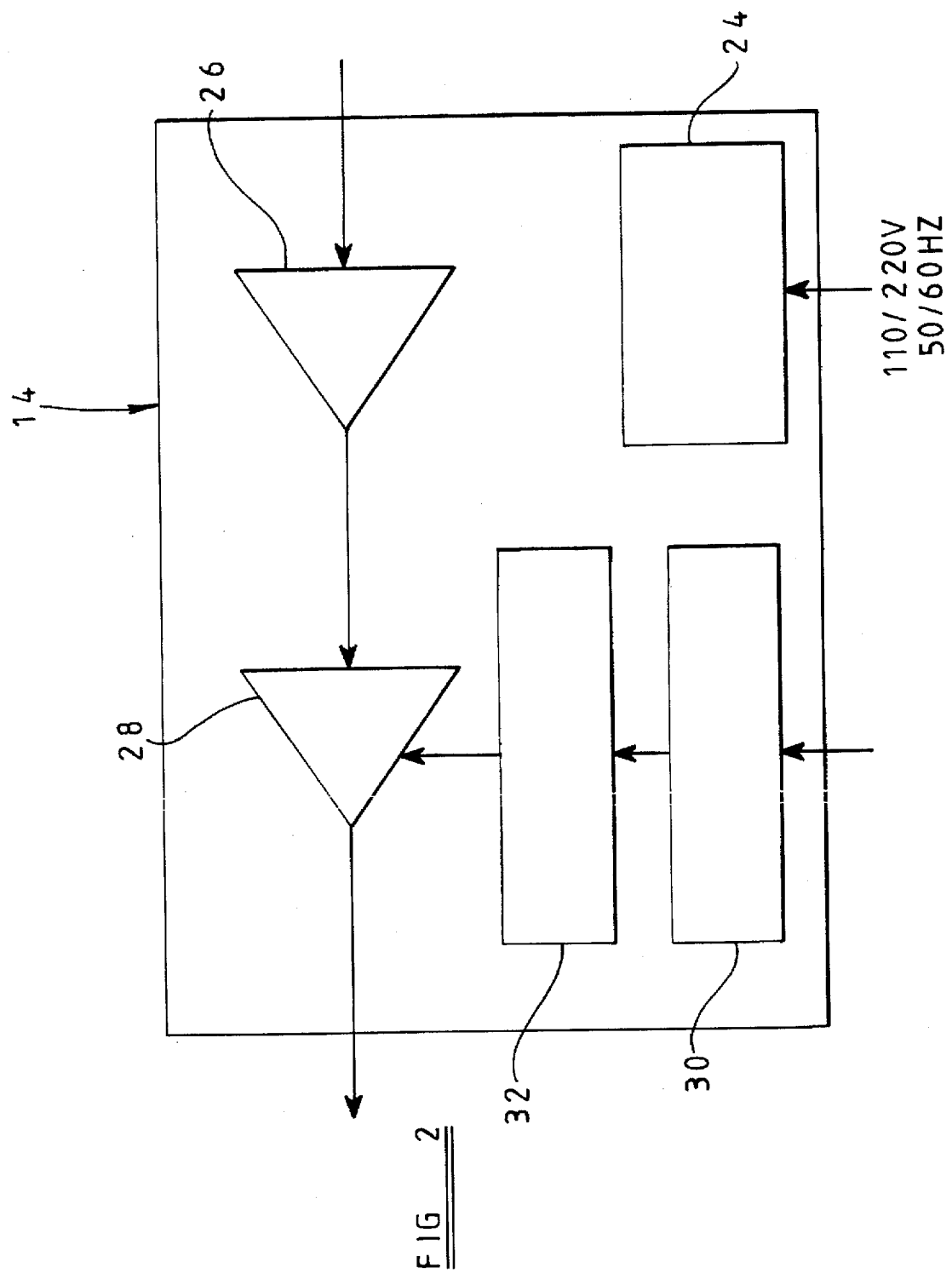
FIG. 2 is a block diagram of the interface unit.

Referring to FIG. 2, the interface unit 14 comprises a stabilised power supply 24, a unity gain buffer amplifier 26, and a unity gain level shifting amplifier 28 for outputting the signal to the wall thickness controller. The feedback signal from the automatic weighing system is supplied to a digital-to-analogue converter 30 by way of the increase weight input or decrease weight input, as the case may be, and the resulting analogue output is supplied to an integrator and memory circuit 32 which integrates the output to obtain a correction factor, and maintains a permanent record of the current correction factor in the memory so that the correction factor is available immediately the machine is started up or production is recommenced after a temporary shutdown. In the event that an increase weight signal, in the form of a pulse of a duration determined by the degree of weight increase required, is supplied to the increase weight input, the correction factor is increased at a constant rate until it reaches a level at which it is maintained until a decrease weight signal is supplied to the decrease weight input to cause the correction factor to be decreased at a constant rate (or until the correction factor is caused to increase further by supply of a further increase weight signal). The amplifier 28 is a unity gain amplifier having a level shifting capability, and the correction factor is used to shift the actual position signal applied to the amplifier 28 so as to cause the wall thickness controller 10 to automatically adjust the die gap to effect the required change in weight of the moulded containers outputted by the machine. Thus the input signal supplied to the wall thickness controller is at all times dependent both on the actual position signal and on the correction factor which is dependent on the increase/decrease weight feedback signal from the automatic weighing machine 16.

It will be appreciated that the correction factor applied to the actual position signal from the transducer will affect the way in which the wall thickness controller controls the width of the die gap. Ideally the wall thickness controller should be able to control the die gap in such a manner and to hold the weight of the moulded product to within a tolerance of less than half a gramme. To achieve this the cumulative errors in the weighing system and the interface unit should be at least one order of magnitude less than this tolerance limit in their effect on container weight. Thus the design of the interface unit is of critical importance in that this unit translates the feedback signal from the weighing system into a suitable form to render it capable of adjusting the die gap.

In order to compensate for the time delay between production of a parison and weighing of the corresponding container produced from the parison, the correction factor applied to the amplifier 28 is obtained by integration of the output from the digital-to-analogue converter 30, and also the increase/decrease weight feedback signals supplied to the interface unit 14 are obtained by comparison of the target weight with the rolling average of the weight values of the last few containers weighed, rather than simply by comparison with the weight value of the last container weighed. The effect of these two techniques is to cause the wall thickness controller to control the die gap in such a manner as to home in on the correct container weight without any appreciable hunting effect.

Figure 6:
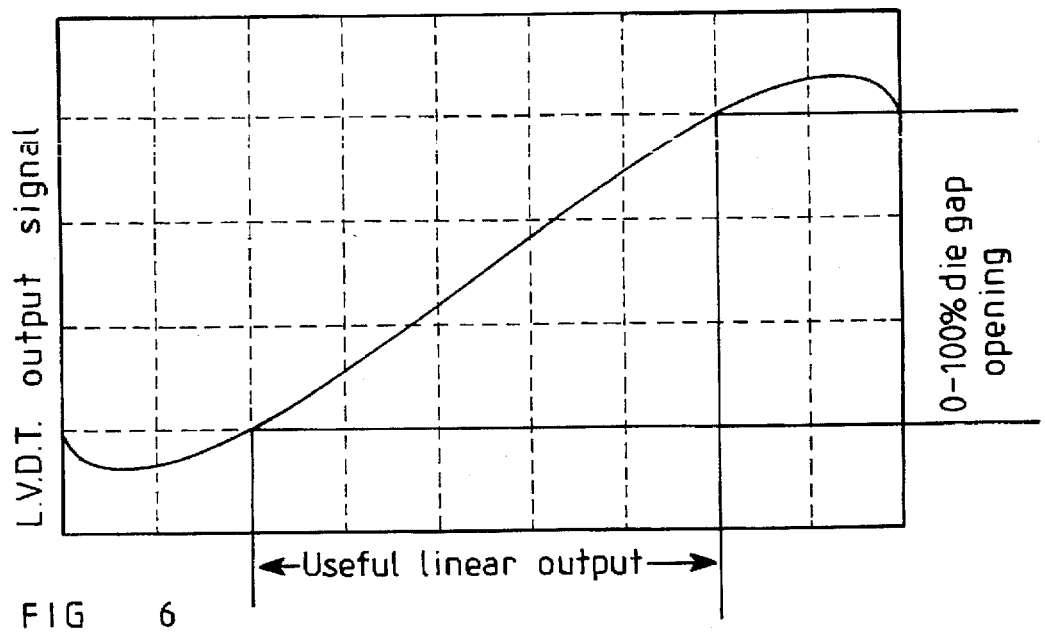
FIG. 6 is a graph showing variation of the output signal from the transducer.

An important feature of the design of the interface unit 14 is that it permits the unit to be retrofitted to upgrade existing extrusion blow moulding machines, without it being necessary to effect major modifications to the designs of such machines. All that is necessary is to connect the interface unit 14 within the input signal line from the transducer 12 to the wall thickness controller 10. Clearly the interface unit 14 is of fully solid state construction, and thus it does not suffer from the problems associated with mechanical linkages such as hysteresis or threshold (deadband) problems, and in addition the response time of the interface unit is effectively instantaneous. The control linearity is dependent on the transfer function of the transducer 12. FIG. 6 shows a graph of the output signal of the transducer 12 against the stroke of the movable die member 6, and it will be appreciated that the transducer will only be used in the linear portion of its stroke range.

Figure 3:
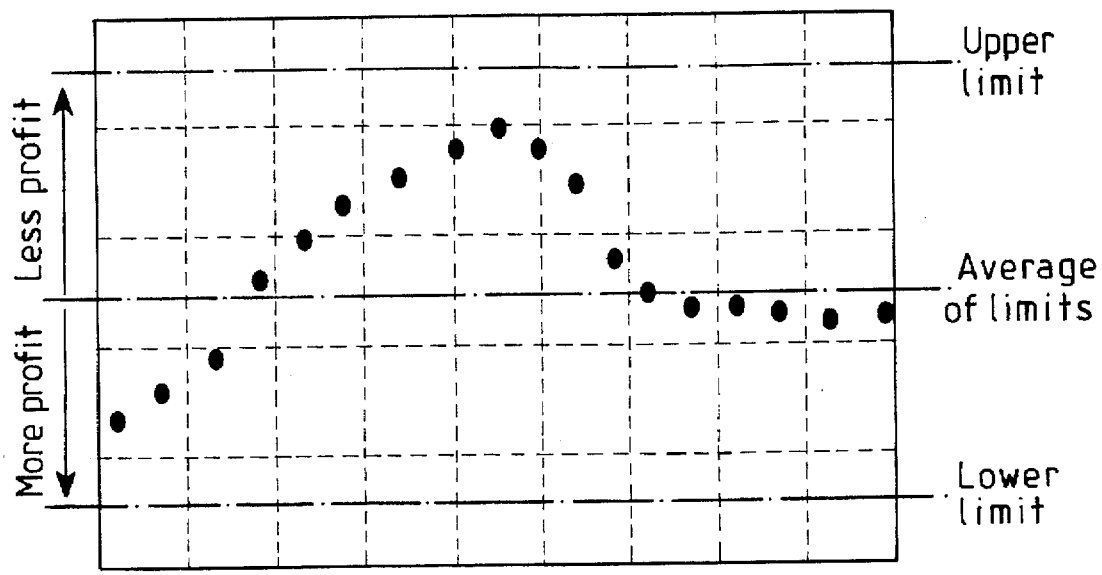
FIG. 3 is a graph of the typical spread of container weights produced by a conventional extrusion blow moulding machine in a production environment.

FIG. 3 shows the spread of weight values obtained by weighing of successive containers outputted by a conventional extrusion blow moulding machine which does not include the interface unit previously described, and illustrates how the weight of the containers may drift appreciably during a typical production run. The deviation from the target weight depends on many factors, such as the inconsistency of the moulding material, including the variable percentage of any scrap material used, the ambient temperature, etc., and the net effect of such factors may be to cause the weight to vary outside acceptable tolerances. Thus, if a specification is to be met in which all containers must have weight values between specified upper and lower limits, it is advisable to set the target weight at an average of these limits in order to ensure that no containers are produced which have weights below the lower limit.

Figure 4:
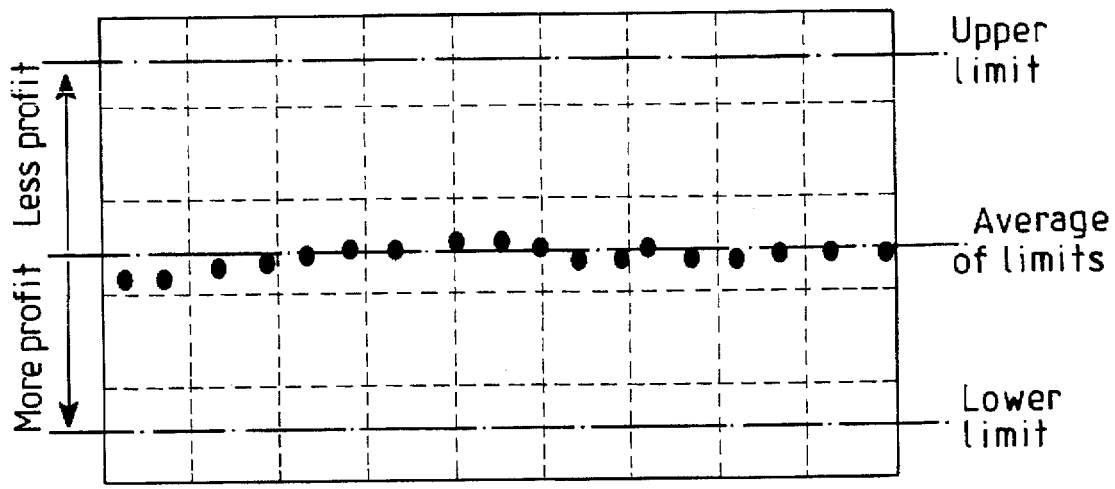
FIG. 4 is a graph of the typical spread of container weights produced by an extrusion blow moulding machine incorporating the interface unit in a production environment.
Figure 5:
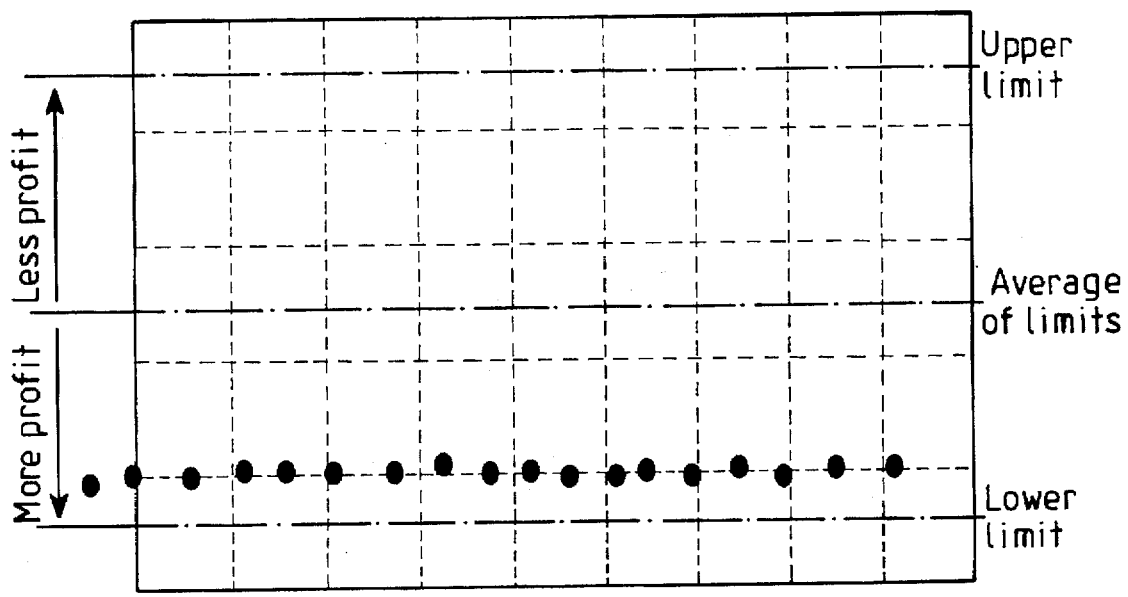
FIG. 5 is a graph showing a weight spread produced by means of the interface unit but with the target container weight adjusted to close to the minimum permitted weight.

FIG. 4 shows the spread of weight values when a similar target weight is set using a machine provided with the interface unit 14. It will be appreciated that, in this case, the spread of weight values is appreciably decreased, and this leads to an improvement in the production quality due to the improved cycle-to-cycle consistency. FIG. 5 illustrates a secondary benefit of the stabilisation of container weights obtained by use of the interface unit in that it shows that the target weight may be set by the machine operator to a value only slightly above the lower weight limit without leading to an appreciable risk that a container will be produced having a weight less than the lower limit. This enables substantial reductions in the total amount of moulding material needed to produce mouldings of acceptable quality.

I claim:

1. An interface unit for an extrusion blow moulding control system for controlling parison wall thickness in an extrusion blow moulding machine, the interface unit being adapted to receive a position feedback signal dependent on the actual width of an extrusion die gap defining parison wall thickness within the machine, as determined by transducer means from the position of a movable member delimiting the die gap, and to supply an output signal to a wall thickness controller for supplying a desired position signal to displacement means for controlling the position of the movable member to provide a desired width of the die gap in dependence on a required parison wall thickness profile set within the wall thickness controller, wherein the interface unit comprises signal processing means for receiving the position feedback signal from the transducer means and a weight feedback signal from weighing means indicative of weight variation of products outputted by the machine, and for applying a correction to the position feedback signal in dependence on the weight feedback signal to compensate for underweight or overweight products outputted by the machine so as to produce said output signal for supplying to the wall thickness controller.

2. An interface unit according to claim 1, wherein input means is provided for receiving the feedback signal and for supplying a correction factor to compensate for underweight or overweight product outputted by the machine.

3. An interface unit according to claim 2, wherein the input means includes a digital-to-analogue converter for converting the feedback signal to an analogue signal.

4. An interface unit according to claim 2, wherein the input means includes an integrator for integrating the signal to produce the correction factor.

5. An interface unit according to claim 2, wherein the input means includes a memory for storing the current correction factor.

6. An interface unit according to claim 2, wherein level shifting means is provided having a first input to which the actual position signal is supplied and a second input to which the correction factor is applied in order to shift the level of the actual position signal.

7. An extrusion blow moulding control system for controlling parison wall thickness in an extrusion blow moulding machine, the control system comprising a wall thickness controller for controlling the width of an extrusion die gap defining parison wall thickness within the machine, input means for supplying an input signal to the wall thickness controller dependent on an actual position signal from transducer means indicative of the actual position of a movable member delimiting the die gap, and output means for supplying a desired position signal from the wall thickness controller to displacement means for controlling the position of the movable member to provide a desired width of the die gap, wherein the input means comprises signal processing means for receiving the actual position signal from the transducer means and a feedback signal from weighing means indicative of weight variation of product outputted by the machine and for producing the input signal for the wall thickness controller in dependence on the actual position signal and the feedback signal.

8. A control system according to claim 7, wherein the wall thickness controller is adapted to vary the width of the die gap during extrusion of a parison so as to vary the wall thickness of the parison along its length to provide a desired wall thickness profile.

9. A control system according to claim 7, wherein the wall thickness controller is adapted to be manually adjustable to vary the desired wall thickness profile and/or the desired parison weight.

* * * * *